March 3, 1970  A. P. SHERMAN  3,499,075
METHOD OF MAKING A POLAROGRAPHIC CHAMBER
Filed March 4, 1966

INVENTOR.
ALLAN P. SHERMAN
BY
*Charles A. Weigel, Jr*

United States Patent Office 3,499,075
Patented Mar. 3, 1970

3,499,075
METHOD OF MAKING A POLAROGRAPHIC
CHAMBER
Allan P. Sherman, Waltham, Mass., assignor to Hewlett-Packard Company, a corporation of California
Filed Mar. 4, 1966, Ser. No. 531,860
Int. Cl. B29f 1/10; B32b 31/04
U.S. Cl. 264—230                                    4 Claims

ABSTRACT OF THE DISCLOSURE

A method of forming a polarographic chamber includes fusing a thermoplastic, heat shrinkable film to a thermoplastic chamber and subsequently heating the film to remove wrinkles.

---

This invention relates to a method of making a walled chamber and, more particularly, to a method of tautly and securely attaching a membrane across the open end of a cavity for use in polarographic analyses.

Polarographic cells are chemical instruments which measure the proportional quantity of a substance in a composition of matter by noting the effect of that substance upon the electrical characteristics of a polarographic cell. In its simplest form the polarographic cell comprises an anode and a cathode in electrical circuit with each other through a suitable electrolyte or electrolyte forming substance. The electrolyte is provided by a compound, solution, or other suitable material which will form with the anode and cathode an electric cell, and which will provide ions for reactions with the substance which it is desired to measure in such a way as to affect the electrical characteristics of the cell. A typical polarograph is described in U.S. Patent 2,913,386 issued to Leland C. Clark, Jr., on Nov. 17, 1959.

If it is desired, for example, to ascertain the partial pressure of oxygen in a liquid or gaseous medium, a polarographic electrode assembly includes an anode and a cathode separated from the liquid or gaseous medium by a thin membrane that is permeable to oxygen. The cathode is generally formed of a platinum wire fused into a glass tube and the anode is formed of a silver tube or a band of silver foil or wire wrapped around the tip end of the glass tube. A thin film of suitable electrolyte, for example, a jellied potassium chloride solution, electrolytically couples the anode and cathode and is held in place by the oxygen permeable membrane. The electrical current carrying capacity of the cell will vary in direct proportion to the quantity of oxygen passing through the permeable membrane and into the electrolyte. This current may be measured to give an indication of the partial pressure of the oxygen in the medium.

Among the prior art polarograph electrode assemblies, one is described in U.S. Patent No. 3,211,638 issued Oct. 12, 1965, to Kenneth G. Halvorsen. Halvorsen describes an electrode assembly in which a permeable membrane is clamped between several concentric rings, and forced against the electrode assembly housing so as to tightly stretch the membrane over the cathode. While operable, this arrangement has disadvantages as it is relatively difficult to construct and the membrane is easily punctured if the proper amount of tension is not maintained.

If a high degree of sensitivity of operation of the polarograph is to be attained, the spacing between the membrane and the cathode is critical. To achieve this high sensitivity, Clark suggests a concentric electrode with a rod of insulating material separating the cathode and anode electrodes. In this instance the lower annular face of the rod is slightly roughened to provide the proper access of the electrotype to the cathode. It is quite difficult to assemble and maintain a taut membrane that retains a good seal and yet a relatively uniform planar surface. If the membrane is wrinkled at all or loose, the electrolyte film thickness cannot be controlled, causing variations in the output of the cell current attributable to the membrane and not to variation in the proportion of the oxygen being measured.

It is, therefore, an object of this invention to obviate many of the disadvantages inherent in the prior art assembly of polarographic cells.

Another object of this invention is to provide an improved method of assembling a chamber having a permeable membrane for one wall for use with polarographic cells.

Still another object of this invention is to provide an improved method of mounting a permeable membrane in which the membrane is maintained taut and uniformly planar at all times.

In accordance with the preferred method of this invention an electrode chamber for use with a polarographic cell is constructed by placing a web of thermoplastic film, which shrinks upon heating, in one end of an injection mold cavity; closing the mold leaving a continuous portion of the film exposed to the interior portion of the mold cavity; and injecting a suitable thermoplastic resin capable of fusing with the film into the mold cavity to form the chamber. The injection is made at a temperature sufficiently high to soften the exposed area of the film to produce a fusion bond between the film and the resin in the mold cavity. The chamber, with the film enclosing one end, is next permitted to cool which results in the film's becoming wrinkled and loose. Finally, the film only is heated quickly as by means of a heated air jet to avoid thermal expansion of the molded chamber itself. Heating is continued until the film shrinks to produce a taut "drumhead" tightness. The fusion of the membrane to the chamber walls forms a fluid and gas tight seal and prevents leakage about the point at which the membrane is joined to the chamber.

The novel features that are considered characteristic of this invention are set forth with particularity in the appended claims. The invention, itself, however, both as to its organization and method, as well as additional objects and advantages thereof, will best be understood from the following description when read in connection with the accompanying drawings, in which:

Figure 1:
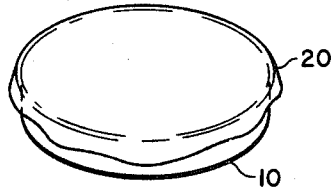
FIGURE 1 is an isometric view of a portion of an injection mold as used in performing the first step of this invention.
Figure 2:
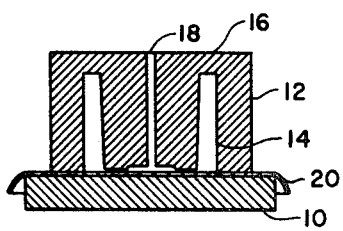
FIGURE 2 is a section view of the complete injection mold used in performing the second and third steps of this invention.
Figure 3:
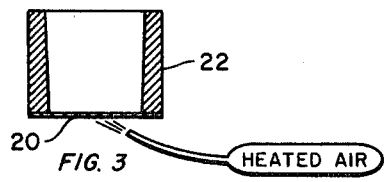
FIGURE 3 is a section view of the walled chamber being processed in accordance with the fourth step of this invention.

The method of this invention will now be described with reference to FIGS. 1, 2 and 3 of the drawing. In performing the method, use is made of a conventional injection molding machine such as a Frohring "Minijector" Model 45. The mold itself may comprise essentially two parts, one being the lower or base member 10, the second being a die member 12 which forms the outside walls 14 of the hollow cylindrical chamber to be molded. Concentrically positioned within the die 12 is a core 16 which is of a tapered or decreasing diameter so as to facilitate the removal of the molded part from the die. An air vent 18 may be formed axially through the core member 16 to facilitate removal of the mold part without rupturing the film as will be described hereinafter.

As the first step of the method, a web of thermoplastic film 20 that is to form the membrane is placed against the base member 10 of the mold which acts as a heat sink to remove heat from the film and prevent its temperature from increasing above its melting point during molding. The particular film material used may be selected according to the substance to be measured by polarography. In accordance with this invention this film may be a biaxially oriented thermoplastic. If the application is oxygen analysis by polarography, the plastic may be a polypropylene resin. Material of this type has the quality that when it is heated it will uniformly shrink in both directions of the plane of its web. Material of this type is available from Hercules Powder Company, and is sold under the trade name "Pro-Fax" and is identified as being B–500 stabilized balanced polypropylene 75 gauge.

As the next step, the die member 12 including the core member 16 of the mold is now placed over the base member 10 and web 20 and clamped tightly against the web 20. A suitable plastic capable of fusing with the web material 20, such as a polypropylene resin, for the oxygen example, is injected into the mold cavity at a suitable temperature, in this case approximately 500° F. For the particular mold described above an appropriate nozzle pressure is approximately 6400 p.s.i. The 500° temperature is capable with the material mentioned to soften the exposed area of the polypropylene film thereby to produce a fusion bond. It may be necessary to provide vents in the mold in accordance with known techniques to allow the mold to fill properly and to prevent the membrane from being disturbed during removal. One such vent is shown in FIG. 2 and has already been identified by the reference numeral 18.

Upon removal from the mold, the resulting molded plastic chamber 22 tends to shrink upon cooling thereby causing the membrane 20 to loosen and wrinkle. Such loosening or wrinkling is overcome in accordance with this invention by suitably heating only the film 20 as by directing a hot air gun or other suitable heat source with an air temperature of approximately 280° F. across the film itself. This operation is necessarily performed quickly to avoid thermal expansion of the molded chamber 22 itself. The heating is continued until the film shrinks to a taut "drumhead" tightness. Upon cooling the film shrinks further, increasing its tautness.

Figure 4:
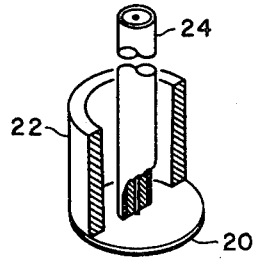
FIGURE 4 is a section view of the completed chamber with the electrodes illustrated in phantom to denote their position relative to the membrane wall of the chamber.

This enhances the sensitivity of the polarograph inasmuch as the electrode 24 may be spaced quite closely to the film with a relatively uniform spacing or gap between the electrode end face and the film itself, as may be observed in FIG. 4. The fusion of the film to the chamber walls provids a completely leak free chamber in which the electrolyte may be contained about the electrode 24. The chamber is easy to construct and is relatively long lived since it is free of the stresses normally existing in the prior art assemblies of this type.

Although described as using a thermoplastic resin such as polypropylene for both the membrane and the chamber walls, this need not always be the case. Different thermoplastics may be employed as long as they are capable of fusing with each other under the influence of heat. As used herein the term "thermoplastic" is intended as including those substances which become plastic under application of heat and rigid at normal temperatures. Included in this definition are both natural and synthetic resins such as, by way of example and not by way of limitation: polypropylene, polyethylene, polycarbonate, polystyrene, acetal, acrylic, vinyl, etc.

It will be obvious that various modifications may be made in the method of this invention. It is intended to cover such modifications and changes as would occur to those skilled in the art.

What is claimed is:

1. A method of attaching a web of thermoplastic film which shrinks upon heating to a molded thermoplastic member to form the wall of a polarographic chamber which wall is permeable to that substance in a composition which it is desired to measure, said wall being capable of separating the polarographic electrodes and their surrounding electrolyte from the composition to be analyzed, comprising the steps of:

placing said web of said film against a planar end of an injection mold cavity adapted to form said chamber, thereby to provide a heat sink for removing heat from said film, closing the mold cavity so as to lease only a continuous peripheral portion of said film exposed to the mold cavity, said exposed film portion defining a closed area on said film, injecting a thermoplastic material capable of fusing with said film into the mold cavity to form said chamber at a temperature sufficiently high to fuse with the exposed area of film, thereby to produce a fusion bond between the film and the thermoplastic material in the mold cavity, the end of the injection mold cavity acting substantially to prevent said film from becoming destroyed by the heat of said injected material, and heating substantially only the thermoplastic film portion of the chamber to produce a taut, planar chamber wall from said film.

2. The method set forth in claim 1 wherein said thermoplastic film is of a type which shrinks upon heating and which method includes the additional steps of:

removing the chamber from the mold and allowing it to cool prior to heating the film.

3. The method set forth in claim 1 wherein said film is a biaxially-oriented thermoplastic.

4. The method set forth in claim 2 wherein said film is a stabilized, balanced, biaxially-oriented polypropylene resin and wherein said thermoplastic member is polypropylene resin.

References Cited

UNITED STATES PATENTS

| | | | |
|---|---|---|---|
| 3,055,253 | 9/1962 | Loughborough | 84—411 |
| 2,667,098 | 1/1954 | McMullen | 84—414 |
| 3,122,598 | 2/1964 | Berger | 264—247 |

DOUGLAS J. DRUMMOND, Primary Examiner

J. C. GIL, Assistant Examiner

U.S. Cl. X.R.

156—85, 242; 264—259